United States Patent [19]

Trema

[11] Patent Number: 5,046,590
[45] Date of Patent: Sep. 10, 1991

[54] BRAKING DEVICE FOR A ROTARY ELEMENT

[75] Inventor: Daniel Trema, Bezons, France

[73] Assignee: Elf France, Courbevoie, France

[21] Appl. No.: 641,819

[22] Filed: Jan. 16, 1991

Related U.S. Application Data

[63] Continuation of Ser. No. 526,768, May 18, 1990, abandoned, which is a continuation of Ser. No. 272,633, Nov. 17, 1988, abandoned.

[30] Foreign Application Priority Data

Dec. 4, 1987 [FR] France .................. 87 16863

[51] Int. Cl.$^5$ .......................................... F16D 55/228
[52] U.S. Cl. ..................................... 88/72.5; 88/71.5; 88/18 A; 88/26; 88/106 P; 88/251 R; 88/244; 88/345; 192/70.14; 192/70.21; 192/803; 192/87.11; 192/107 M
[58] Field of Search .......... 188/251 R, 251 M, 251 A, 188/344, 345, 106 P, 71.5, 72.5, 73.1, 73.2, 18 A, 26; 192/107 M, 83, 87.11, 87.18, 70.14, 70.21

[56] References Cited

U.S. PATENT DOCUMENTS

| | | | |
|---|---|---|---|
| 2,062,167 | 11/1936 | Dieter | 188/345 |
| 2,142,174 | 1/1939 | Burrow . | |
| 2,831,324 | 4/1958 | Baldwin | 188/345 X |
| 2,987,145 | 6/1961 | Sampson | 188/251 R X |
| 3,487,894 | 1/1970 | Szigeti | 188/345 X |
| 3,647,033 | 3/1972 | Klein | 188/251 R |
| 3,856,120 | 12/1974 | Kwolek et al. | 188/73.1 X |
| 3,948,363 | 4/1976 | Ely | 192/107 M X |
| 3,951,240 | 4/1976 | Dowell et al. | 188/251 M X |
| 4,062,427 | 12/1977 | Klaue | 188/18 A |
| 4,614,254 | 9/1986 | Mery et al. | 188/71.5 |
| 4,756,392 | 7/1988 | McMurray | 188/251 M |

FOREIGN PATENT DOCUMENTS

| | | | |
|---|---|---|---|
| 0117192 | 2/1984 | European Pat. Off. . | |
| 0138345 | 4/1985 | European Pat. Off. . | |
| 1948457 | 4/1971 | Fed. Rep. of Germany | 188/345 |
| 1052306 | 1/1954 | France . | |
| 1434026 | 2/1966 | France . | |
| 1523402 | 3/1968 | France . | |
| 7235343 | 6/1973 | France . | |
| 112448 | 11/1925 | Switzerland . | |
| 1078368 | 8/1967 | United Kingdom | 188/251 R |
| 1084410 | 9/1967 | United Kingdom | 188/345 |
| 1201370 | 8/1970 | United Kingdom | 188/73.1 |
| 1269725 | 4/1972 | United Kingdom | 188/345 |
| 1311785 | 3/1973 | United Kingdom . | |

*Primary Examiner*—George E. A. Halvosa
*Attorney, Agent, or Firm*—Burgess, Ryan & Wayne

[57] ABSTRACT

Braking device for a rotary element such as a vehicle wheel in which is provided at least two distinct braking assemblies for the braking of a single wheel or axle, and which are connected to distinct braking pressure generators which have a ratio between their actuating force by an actuating member and the pressure generated which is such that, for small actuating forces, only the pressing member of the first assembly is actuated, up to a transition point of the actuating force, from which the pressing members of the first and the second assemblies are simultaneously actuated, the device being applied to highly moderable braking of vehicles adapted for high speeds, such as motorcycles.

3 Claims, 2 Drawing Sheets

BRAKING DEVICE FOR A ROTARY ELEMENT

This application is a continuation, of application Ser. No. 526,768, filed May 18, 1990, which is a continuation of U.S. Pat. No. 272,633, filed Nov. 17, 1988, both filed.

BACKGROUND OF THE INVENTION

1. Field of the Invention

The present invention concerns a device for braking a rotary element comprising at least two distinct braking assemblies each having at least one friction surface or track and an associated friction lining between which is applied, in the contact zone or region during braking, a friction coefficient.

2. Summary of the Prior Art

Disk brakes that have a much more constant and stable friction coefficient than drum brakes but which require greater actuating powers, are now used for almost all vehicles adapted to run at high speed on a track or running path: tourist and sports cars, motorcycles, rapid rail vehicles, regular passenger and freight aircrafts and military planes, etc. The only drawback inherent in such brakes resides in their smaller capacity as parking brake, which thereby still provisionally prevents them from being used for heavy industrial vehicles where the parking brake has an important role.

For more rapid vehicles such as competition cars and motorcycles that exceed speeds of 300 km/h and for the high-speed train (TGV) which also exceeds this speed in trial runs, it has been necessary to use novel materials for disk brakes and for the friction linings cooperating with these disks. Competition cars and motorcycles have thus been fitted with disk brakes made of carbon fibers cooperating with friction linings also made of carbon fibers, while high-speed trains will be fitted with disks made of stainless steel cooperating with friction linings made of sintered studs or pins, while awaiting use at a later date of disk brakes also based on carbon fibers.

One drawback of the brake disks made of carbon fibers which has recently been observed, and in particular on high speed motorcycles, and which has already become apparent to a lesser degree on underground railway (sub-way) cars fitted with wooden brake blocks (hard wood such as ash wood) rubbing on steel wheels, is due to the fact that the friction coefficient of such friction assemblies or pairs (carbon/carbon or wood/steel) is only satisfactory when the friction surface or track is hot. This friction property rather goes against those most currently used up to now (the earliest used friction assembly: cast iron shoe on steel wheel, exhibits a friction coefficient which considerably decreases when the friction speed and the temperature increase, which thereby prevents destructive heating of the wheel and ensures excellent parking braking) and does not allow the rapid establishment of the maximal permitted braking deceleration. This latter requirement which is apparently of little importance for airplanes that brake progressively, has revealed to be very important for other applications, especially for motorcycles where the load transfer onto the front wheel greatly affects the braking control and depends mainly upon the initial deceleration obtained.

One of the aims of the present invention is specifically to overcome these difficulties and to provide that significative braking forces are established, upon application of the brake, allowing the driver of the vehicle to regulate and adjust the sequel or continuation of the braking while enjoying correct feedback information and a good proportionality between the brake actuating forces and the effectively obtained decelerations.

For this purpose, the materials of the two elements of the first assembly being such that the friction coefficient decreases when the temperature of the friction track increases and the materials of the two elements of the second assembly being such that the friction coefficient increases when the temperature of the friction track increases and the friction surface of track of each braking assembly being preferably carried by or formed onto a brake disk, according to the invention, the distinct members for pressing the friction linings are connected to distinct braking pressure generators, for example master cylinders, that have a ratio between their actuating force by an actuating member and the generated pressure which is such that for small actuating forces, only the pressing member of the first assembly is actuated up to a transition point of the actuating force, from which the pressing members of the first and of the second assemblies are simultaneously actuated.

According to another embodiment allowing to further limit the deceleration jerks and jolts provoked by the sudden increase of the friction coefficient of the second assembly, the actuating member of the second assembly cooperates with at least one overbalance spring adapted to reduce the braking pressure of the second assembly with respect to that of the first assembly by a substantially constant value.

According to one advantageous embodiment of the invention, the friction path of the first assembly is made of a ferrous material such as cast iron or steel and cooperates with friction linings made of composite material (for example, asbestos- or plastic material based), giving a friction coefficient that is stable but which rapidly decreases for high temperatures of the friction track, while the friction track of the second assembly is made of a fibrous material such as carbon fibers and cooperates with a friction lining made of a fibrous material of the same type and the friction coefficient of which increases when the temperature of the friction track increases.

According to another embodiment of the invention, giving yet better performances, the friction track of the first assembly is made of a ferrous material having high heat resistance such as a stainless steel in permanent austenitic structure and cooperates with a friction lining made of hard material such as sintered material, while the friction track of the second assembly is made of a fibrous material such as carbon fibers and cooperates with a friction lining made of a friction material of the same type giving a friction coefficient that increases when the temperature of the friction track increases.

According to another very compact embodiment of the invention, the friction tracks of the first and second assembly are formed on two disks, respectively made of ferrous material and fibrous material, which are driven in simultaneous rotation by a group of splines borne by a support drum integral in rotation with the rotary member and are pressed against each other through the intermediary of a plane annular face inside a single caliper or yoke or a single braking clamp adapted to simultaneously press one annular face of the disk made of ferrous material and one annular face of the disk made of fibrous material, so that the two disks are in mutual thermal contact condition. The disk made of ferrous material is advantageously placed in the position enjoying the greatest cooling, i.e. generally, in the position the most exposed to the driving wind of the vehicle, so as to facilitate retaining the heating of the disk made of fibrous material while limiting the drop of the friction coefficient of the other disk made of ferrous material. The mounted-on disks made of different materials can be disposed in two pairs, each pressed by a caliper or yoke, in order to obtain double disks and double calipers brakes comprising, in fact, four brake disks.

According to one embodiment improving the stability of the braked vehicle, in particular a motorcycle equipped with a powerful disk brake on the front wheel, the friction track (or the annular abuting sides) of the disk of the first braking assembly is (are) located on the median plane of the braked wheel, whereby the driving shifts provoked by the initiation of the braking process, which generally starts on this disk which brakes well when cold, are reduced.

In the embodiment of the invention, and if use is made for the first braking assembly of a brake disk made of cast iron and conventional friction linings for automotive and motorcycles, the friction coefficient decreases slowly when the temperature of the disk, and thus of the contact zone, increases up to a temperature known as transition temperature generally situated between 350° and 450° C. and for which the friction coefficient drops rapidly to about half its initial value. When the second braking assembly according to the invention is not foreseen, the user has the impression that the brakes "collapse" without it being able to reestablish the correct level of the braking forces. In the device according to the invention, the second braking assembly has heated and takes over the braking which practically does not decrease although its initial application is able to be both rapid and moderable due to the good progressivity of the conventional assembly: cast iron or steel disk-composite friction linings.

The two disks of the two distinct assemblies have substantially the same external and internal diameters, but different thicknesses and generally, the disk of the second assembly has the greater thickness, which enables to compensate the fact that it dissipates the greatest part of the braking energy and that it is made of a relatively mild material.

According to another embodiment aimed at encouraging the rapid obtention of high braking powers, the disk of the second assembly has a small thickness of 3–4 millimeters adapted to allow its rapid heating during braking.

According to another embodiment allowing to better use the different braking and heat dissipation capacities of the two disks, the distinct members for pressing the friction linings include application pistons having different diameters, the piston(s) of the second assembly having the smaller diameter.

BRIEF DESCRIPTION OF THE DRAWINGS

Other aims, objects and features of the invention will become apparent from the following description of various embodiments, given by way of non-limitative illustration with reference to the appended drawing in which.

DETAILED DESCRIPTION OF THE DRAWINGS

Figure 1:
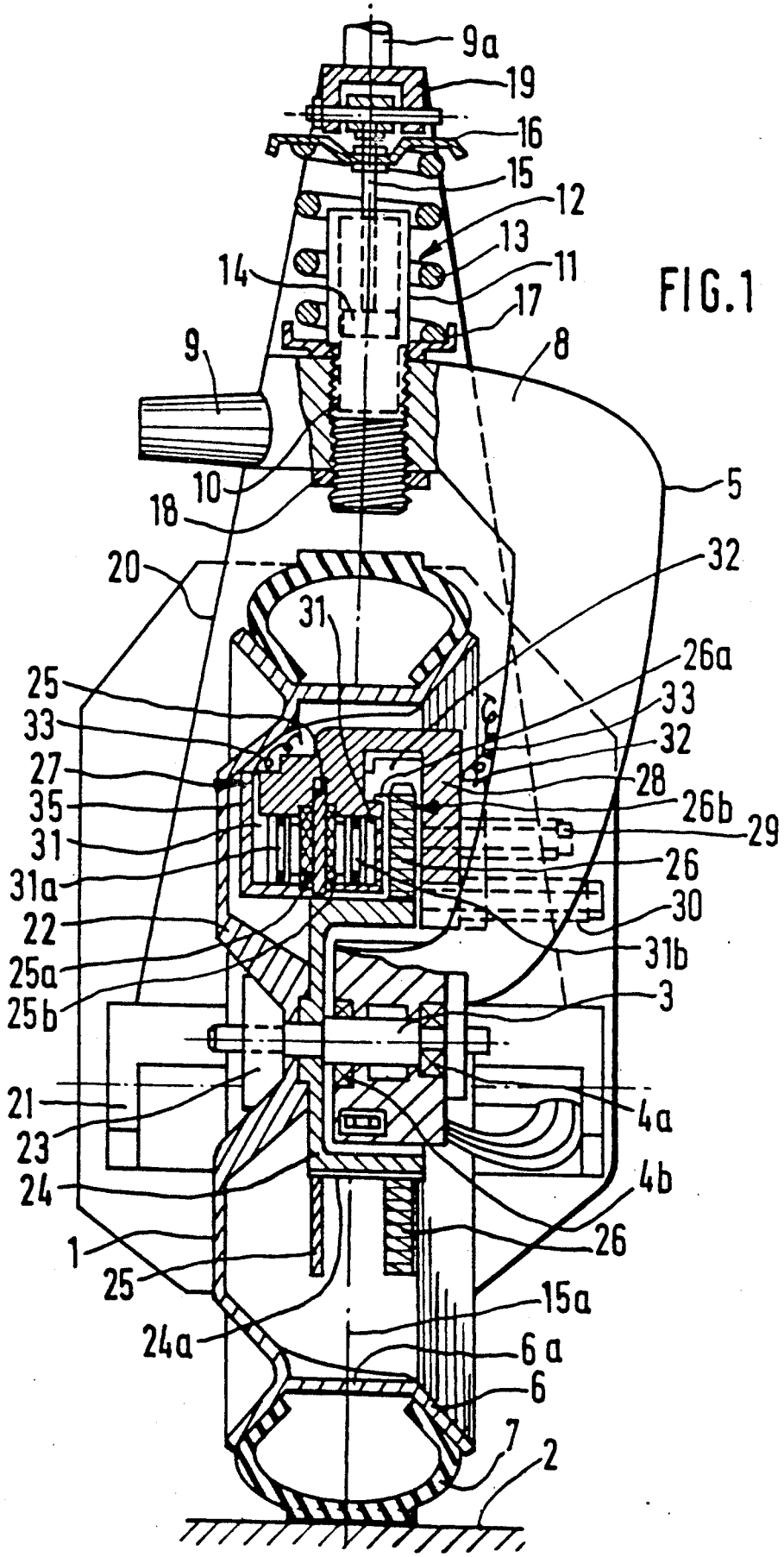
FIG. 1 represents, in frontal elevation and in cross-section through the axis of the wheel hub, a front motorcycle gear using a braking device having two disks according to the invention.

FIG. 1 represents the frontal view of the front gear of a motorcycle, comprising a front wheel 1, which runs on a running path 2, by rotating with its axle 3 mounted on ball bearings 4a and 4b carried by a single suspension arm or strut 5. The single arm 5 has a C-shaped bent part which encases the section of the wheel 1 constituted by a rim 6 having a bottom 6a and a tire 7. The upper part 8 of the single arm 5 has a trunnion 9 connecting to a steering bar 9a and a threaded bore 10 receiving the body 11 of a combined spring shock absorber 12 comprising an external spring 13 and an internal shock absorbing piston 14, movable in a bore of the body and of which the rod 15 is connected to an upper bearing plate 16 of the spring 13. The lower bearing of the spring 13 consists of a cup 17 screwed onto the body 11 for maintaining it in position on the upper part 8 of a single arm, by cooperating with a screwed lower blocking ring 18. The upper bearing plate 16 is connected to the front nose 19 of the chassis 20 of the motorcycle supporting the engine-transmission block 21 and also the weight of the driver and possible passengers of the motorcycle. In a straight running, the axis of the rod 15 is placed substantially in the median plane or running plane 15a of the tire 7.

The hub 22 of the wheel 1 is pressed by a nut 23 onto the axle 3 and rendered integral in rotation with a drum 24 for supporting brake disks. The drum 24 is provided on its periphery with splines 24a on which axially slide corresponding splines of the two brake disks 25 and 26 which are, in fact, axially positioned through contact with the friction linings that cooperate with the friction surfaces of these disks.

The friction linings 25a and 25b of the disk 25 are carried by a disk brake caliper or yoke 27 secured onto an intermediary or connecting piece 28, itself secured onto bosses 29, 30 of the arm 5. The caliper or yoke 27 comprises respective brake pistons 31a and 31b movable in a sealed manner, in a bore and subjected, during braking, to hydraulic pressure in order to press the friction linings 25a and 25b in contact with the friction surfaces of the disk 25.

The brake disk 26 that constitutes a second brake disk located opposite the web of the wheel 1, cooperates with a second disk brake caliper 32 represented only in external view. In the embodiment represented on FIG. 1, the second brake caliper 32 carries friction linings 26a and 26b and is not located in the cross-section plane. The caliper 32 is assembled and secured to an extension of the connecting piece 28 and its mean plane is shifted with respect to the mean plane of the caliper 27 in order to take into account the shifting of the plane of the disk 26 with respect to that of the disk 25.

According to the embodiment of the invention represented on FIG. 1, the brake disk 25 is made of cast iron for brake disk, for example lamellar perlite cast iron, to constitute a washer of small thickness, 3 to 4 mm for example, provided with internal splines allowing it to be axially displaced on the corresponding splines 24a of the drum 24 while being driven in rotation by the drum 24. The friction linings 25a and 25b that cooperate with the disk 25 are made of a relatively mild composite friction material, for example, asbestos-based, of which the friction coefficient drops (passing for example from 0.4 to 0.2) when the disk 25 exceeds a temperature of about 400° C., designated by those skilled in the art as transition temperature. These friction linings have, on the other hand, when cold and up to temperatures comprised between 250° and 300° C., a very stable friction coefficient that is relatively insensitive to the presence of water on the friction surfaces of the disk.

The disk 26 itself is made of a fibrous material, for example, based on carbon fibers, and has a greater thickness than the disk 25, for example of about 10 to 15 mm while presenting a solid or ventilated structure. This greater thickness is useful for transmitting the friction torques to the splines 24a of the drum 24 since the internal splines of the fibrous material are more fragile than those of the cast iron. The greater thickness of the disk 26 also corresponds to greater heat stresses of this disk and to a greater wear of its friction surface. The friction linings 26a and 26b that cooperate with the disk 26 are also made of a carbon fiber-based material. The friction pair constituted by a disk of carbon fibers and carbon fibers linings has a low friction coefficient when cold and which increases when the temperature of the contact zone increases. The behavior of such a friction pair or assembly is similar to that already mentioned herein-above and which is constituted by brake blocks made of hard wood, such as ash wood, rubbing against steel wheels and of which the friction coefficient decreases when the speed decreases, the carbon-carbon friction pair nevertheless undergoing a much more sudden increase of the friction coefficient.

The operating of the braking device represented on FIG. 1 will now be described in detail. When the motorcycle driver brakes moderately, the brake calipers 27 and 32 are simultaneously pressed, for example by double master cylinders (not represented) and connected by hoses such as flexible hose 33 to the hydraulic chambers 31 delimited by the brake pistons 31a and 31b. The friction coefficient between the disk 25 and the friction linings 25a and 25b is thus maximal and stable, while the friction coefficient between the disk 26 and the linings 26a and 26b is small and increases with temperature. The greatest part of the braking torque is supplied by the disk 25 which is moderately heated (about 150° C.) and which ensures a very moderate braking which is extremely sensitive to the driver's releasing action, which is important in order to prevent the blocking of the front wheel on wet and/or slippery roads.

If the moderated braking is continued, for example in a mountain descent, the disk 26 made of carbon fibers ends up by heating and greater friction forces are suddenly developed on this disk. The driver of the motorcycle is thus immediately warned thereof prior to blocking of the wheels and decreases his braking application force in consequence thereof, the braking power being transferred from the relatively heated disk 25 to the disk 26 adapted to support very high temperatures able to exceed 600° C.

When the driver needs to brake suddenly (the most critical being for example during race braking at the end of a straight line on a dry road, from a very high speed able to reach 300 km/h), he suddenly actuates simultaneously the application of the calipers or yokes 27 and 32. The first engagement of the brake is essentially produced on disk 25 when cold and when supports about three-quarters of the braking torque while disk 26 is rapidly heated at the surface due to the low heat conductivity of the carbon fiber-based material. Disk 25 which has a better conductivity heats very rapidly due to its very small thickness and its surface temperature exceeds, after a very short period of time of about 2 seconds, the transition temperature of the friction coefficient, comprised between 350° and 450° C., which decreases the friction coefficient sometimes by half. At this moment, the braking should allow to appear defect signals but due to the very rapid superficial heating of the disk 26, the friction coefficient of this disk with the linings 26a and 26b considerably increases until it almost balances the drop of the friction coefficient on the disk 25. The braking that was at the beginning supported for three-quarters by the cast iron disk 25 is thus supported for the greatest part by the carbon fibers disk 26 which has a very high heat resistance. The carbon-carbon friction coefficient being higher than that of the cast iron-conventional linings pair, the pistons of the brake caliper 32 can have a smaller diameter than those of the caliper 27. Upon release of the brakes, the cast iron disk 25 is rapidly cooled due to its small thickness and it is ready, after several seconds of free rolling, to again ensure the very moderable application of braking during the delicate phase of the suspensions deflections (jump movement upon braking).

Figure 2:
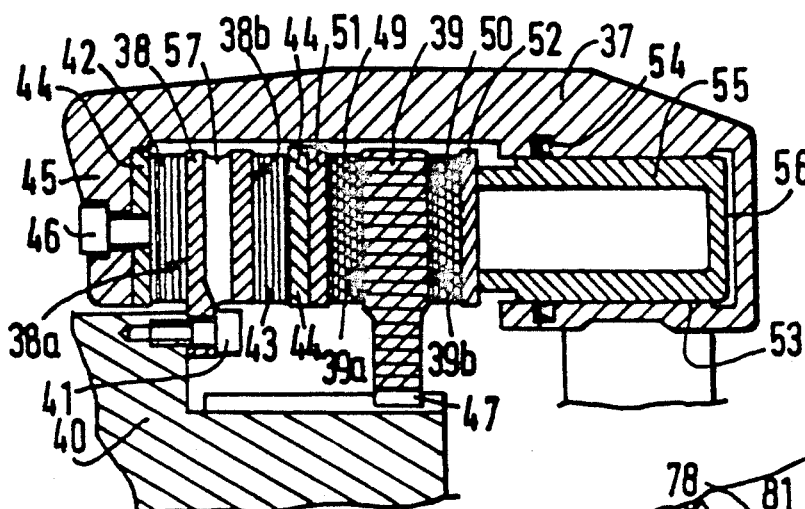
FIG. 2 is a fragmentary view in cross-section of a braking device having two disks according to the invention where the disks cooperate with a common pressing caliper or yoke.

In the embodiment shown in FIG. 2 and which can, for example, be applied to a tourist car, a single brake caliper 37 is used to press two brake disks 38 and 39 which are made integral, at least in rotation, with a wheel hub 40. The disk 38, made, for example, of cast iron molded with axial ventilation grooves 57, is secured at its base by a set of screws 41 to wheel rim 40. The ventilated disk 38 cooperates with relatively soft friction linings 42 and 43 made of composite material (plastic material base) secured onto a support base made of sheet metal 44. The most external base 44 is hooked to the external tip 45 of the caliper 37 by a screw 46.

The second disk 39 is made of a fibrous material, for example carbon fiber-based, and has internal splines 47 which are engaged upon external splines provided on the wheel rim 40. The two lateral friction surfaces of the disk 39 cooperate with friction linings 49 and 50 made of fibrous material of the same type as the disk and also carried by sheet metal plates 51 and 52.

The brake caliper 37 comprises an internal bore 53 wherein moves, in a sealed manner by a means of an O-ring 54, a relatively long brake piston 55 in order to ensure the simultaneous pressing of the two disks. The piston 55 delimits with the caliper 37 a hydraulic chamber 56 which is connected to a hydraulic braking pressure generator (not represented).

During braking with the device represented on FIG. 2, the pressurisation of the hydraulic chamber 56 pushes the piston 55 towards the left of the figure and the caliper 37 towards the right, which provokes the simultaneous pressing of the disks 38 and 39 by the corresponding fricton linings. At the beginning of braking, the disks 38 and 39 are cold and only the friction surfaces 38a and 38b of the disk 38 have a high friction coefficient of about 0.4 while the friction coefficient of the surfaces 29a and 39b of the disk 39 only have a low friction coefficient of about 0.1. Due to the ventilation grooves 37 of the disk 38, its heating remains limited to values lower than 350° C. and the friction coefficient of the disk 38 remains stable. During long duration braking, for example on a long downhill run, the disk 39 is sufficiently heated for its friction coefficient to increase up to significant values of about 0.4, while the heating of the ventilated disk 38 becomes exagerated, thereby provoking a substantial decrease in its friction coefficient. The braking power is thus transferred from the ventilated disk 38 towards the carbon fibers disk 39 which is more resistant to heating.

In case of sudden braking, the friction surfaces 28a and 38b of the ventilated disk are rapidly heated prior to a heat transfer being able to be established by the ventilation and the friction coefficient of the disk 38 decreases at the moment where that of the disk 39 suddenly increases, subsequent to the heating of its surface which thus takes over braking. The driver of the vehicle was able to enjoy the stability and the progressivity of the cast iron-composite lining friction pair 38, 42, 43 and adjust the magnitude of its braking before depending, for achieving braking, upon the carbon-carbon pair 39, 45, 50 which has an instability zone of the fiction coefficient at about 400° C. but guarantees beyond this temperature zone a stable and high friction coefficient. For certain uses, it is possible to foresee that the carbon fibers disk 39 has a thickness considerably smaller than the cast iron disk, thereby favorizing its rapid heating. The change of the disk 39 can thus be systematically foreseen at each change of the friction linings.

Figure 3:
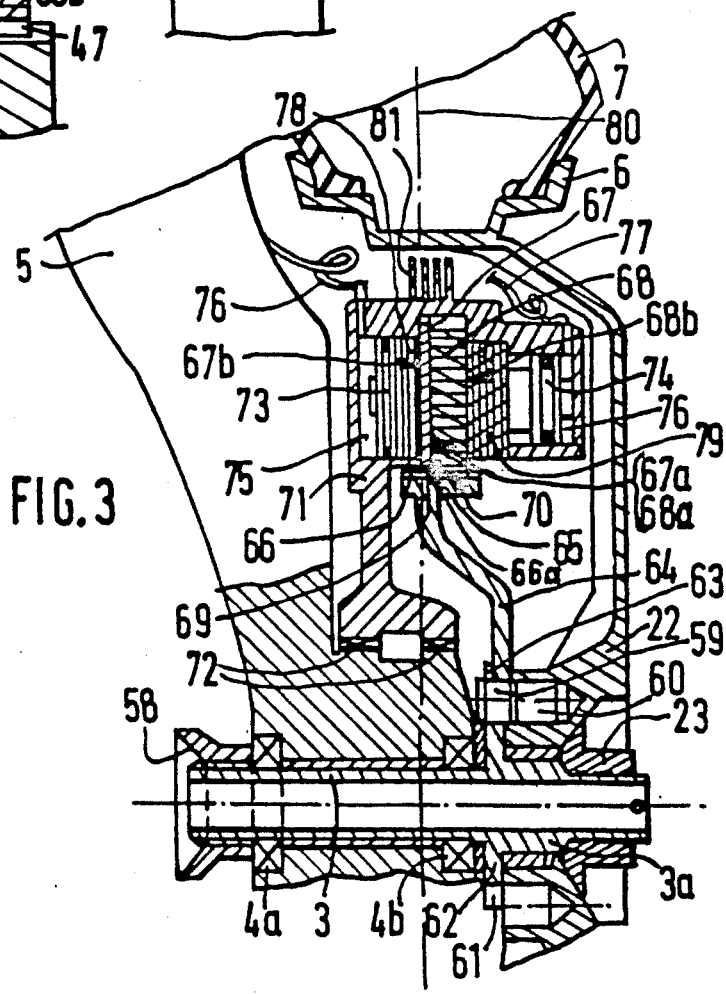
FIG. 3 is a fragmentary view in cross-section of a front motorcycle gear comprising a braking device according to the invention with a single caliper or yoke and two distinct mounted-on brake disks.

The motorcycle front gear represented in a fragmentary manner and in cross-section in FIG. 3 comprises elements which can be found in the device represented in FIG. 1 and which bear the same reference numerals, especially a single suspension arm 5 that carries, through the intermediary of ball or roller bearings 4a and 4b, a rotary tubular axle 3 pressed onto the bearing 4a by a nut 58. The hub 22 of a wheel 1 which has a rim 6 on which is mounted a tire 7, is pressed onto a strengthened part 3a of the rotary axle 3 by a nut 23 in such a manner as to obtain a coupling in rotation between, on the one hand, the heads 59 of screws 60 screwed into the hub 22 made of a light alloy and, on the other hand, the teeth 61 of a flange 62 integral with the tubular axle 3. The heads 59 of the screws 60 are also coupled through the intermediary of integrated washers 63 to a rigid bell-shaped flange 64 which bears, through a cylindrical rim 65 provided with outer splines 66, two brake disks 67 and 68.

The brake disks 67 and 68 are mounted back to back, abuted together by their respective plane faces 67a and 68a and axially slide by their inner splines 69 and 70 on the corresponding splines 66 of the rim 65. The disk 67 made of a stiff ferrous material such as stainless steel, is preferably axially retained in abutment, against the dominate action of brake piston 73, by means of a resilient abutment circlip 66a fitted by resilient pressing in a corresponding circumfernncial groove provided transversally relative to the splines 66 on the rim 65. The disks 67 and 68 are straddled by a single brake caliper or yoke 71 which is rotary mounted by needle bearings 72 on the single suspension arm 5 and which is prevented from turning by a retaining link (not represented).

The caliper or yoke 71 has here two bores having axes perpendicular to the friction surface of the disks 67 and 68 and in each of which sealingly moves a respective brake piston 73, 74. The respective pressure chambers 75 and 76 delimited inside the caliper or yoke by pistons 73 and 74 are connected by flexible hoses 76 and 77 to a braking hydraulic pressure generator such as a simple or double brake master-cylinder. The piston 73 pushes a brake lining 78, made of asbestos- or sintered friction material in abutment with the friction surface 67b of the disk 67 having a thickness of about 3 to 4 mm and made of a material having a high heat resistance, such as brake quality stainless steel which has no physico-chemical transition gamma point during heating (permanent austenitic structure). The piston 74 which has a diameter smaller than the piston 73 pushes a friction lining 79 made of carbon fibers-based fibrous material in abutment with the face 68b of the disk 68 also made of carbon fibers-based material in a thickness greater than the disk 67 and of about 20 mm.

The jointing faces 67a and 68a of the disks 67 and 68 are substantially disposed in the median plane 80 of the tire 7, i.e. in the median running plane of the wheel 1, thereby having the effect of rendering the friction surface 67b of the disk 67 closer to the median plane 80 than the friction surface 68b of the disk 68. In order to limit the heating of the parts of the caliper or yoke 71 close to the disks 67 and 68 and thus the heating of the brake fluid contained in the hydraulic chambers 75 and 76, which could thus boil while the chambers would lose their sealing, cooling ribs 81 are provided on the periphery of the caliper 71. It is possible, according to certain embodiments, to render integral the disks 67 and 68, for example by gluing, but the preferred embodiment consists in leaving these brake disks separate so as to allow them to dilate in a differential manner and to authorize the change of one of these disks, independently from the other.

When the brake according to the invention represented on FIG. 3 is applied moderately from the cold condition of the friction linings and the disks, only the friction coefficient between the friction lining 78 and the side 67b is significative (of about 0.4 to 0.5), the initial friction coefficient between the lining 79 and the side 68b being initially low (of about 0.1). The disk 67 thus supplies the essential of the braking forces and rapidly heats up to a balance point where it assigns its heat partially to ambient air and partially to the carbon fibers disk 68.

Should the moderated braking continue, for example in a long downhill run, the temperature of the side 67b of the disk 67 exceeds the limit temperature for which the friction coefficient of the sintered lining 78 starts to decrease. At this moment, the friction pair carbon fibers disk 68-carbon fibers linings 79 is already heated up to the transition temperature and has taken over, which normally leads the driver to slightly reduce his braking force control.

In the case of sudden braking at high speed, the lining 78-side 68b friction pair supplies a braking torque sufficient during the brief time necessary for the superficial heating of the side 68b of the disk 68 which thereafter takes over the braking torque. The sudden heating of the steel disk 67 is limited by the mass of the disk 68 which thus forms a heat well.

According to the service experience and the type of use of the vehicle upon which is mounted the brake device with two disks according to the invention, it is possible to chose ratios between the diameters of the pistons 78 and 74 which allow to obtain:
either a good relay between the friction pairs during a violent braking;
or a well distributed and proportionated wear of the friction linings 78 and 79 and of the friction surfaces 67b and 68b of the disks.

Figure 4:
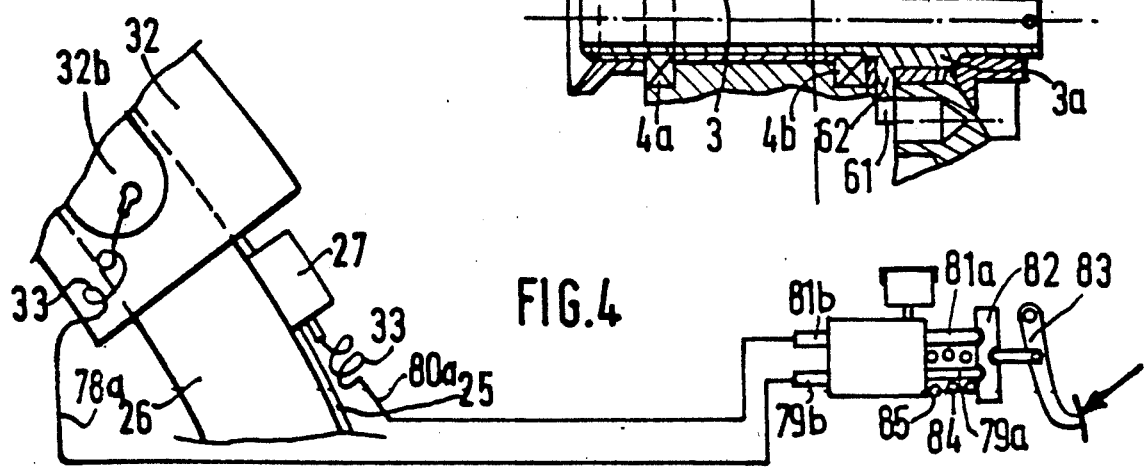
FIG. 4 is a fragmentary and schematic view representing two distinct brake calipers or yokes of the braking device having two disks according to the invention, these calipers being connected to a double master-cylinder with "overbalance" of the pressure of one of these circuits.

In FIG. 4 is shown in a fragmentary manner the caliper 32 for pressing the brake disk 26 made of fibrous material represented in FIG. 1, as well as the caliper 27 for pressing the disk 25 made of cast iron. The cylinder 32b of the caliper 32 is connected by a conduit 78a to a master-cylinder 79b while the cylinders (not represented) of the caliper 27 are connected by a conduit 80a to a master-cylinder 81b. The pushers 79a and 81a of the master-cylinders 79b and 81b are actuated in parallel by a rocking arm 82 mechanically connected to a single brake pedal 83. According to one embodiment of the invention, an "over-balance" spring 84 (normally pre-stressed) is interposed about the pusher 799a between the rocking arm 82 and a abutment edge 85 of the master-cylinder 79b.

When the driver actuates the brakes of the motorcycle by pressing on the pedal 83 with a moderate force, the reaction force of the spring 84 is opposed to the actuating of the pusher 79a and only the brake cylinders of the caliper 27 are subjected to a braking pressure. The low braking which must, in certain cases (for example, on slippery and/or wet and/or curved roads) be very moderable and very stable, is thus exerted only on the cast iron disk 25.

Should the driver increase the pressure on the pedal 83, he exceeds the reaction force of the spring 84 and the cylinder brake 32b (of the caliper 32 of the disk 26 made of fibrous material) starts to receive a braking pressure. Due to the quasi constant reaction force of the pre-stressed spring 84, the braking pressure that is exerted on the carbon fibers disk 26 has a permanent difference with respect to the pressure that is exerted on the cast iron disk 25. In order to further clarify the invention by way of example, if the maximal braking hydraulic pressure which is exerted on a cast iron disk 25 is for example 100 bars, the pressure difference provoked by the pre-stressed spring 84 is for example about 20 bars. In other words, and according to the language of those skilled in the art, the braking circuit 80a of the cast iron disk 25 presents a quasi consistant "overbalance" of 20 bars and the maximal braking pressure applied to the disk 26 cannot exceed 80 bars.

During braking over a long duration, for example, downhill, the brake disk 28 ends by heating to beyond the transition temperature where its friction coefficient suddenly increases. The increase of the deceleration of the motorcycle is however limited by the fact that the braking pressure that is exerted on the disk 26 is lower than that exerted on the cast iron disk 25.

In the case of sudden braking with the braking device represented on FIG. 4, the temperature of the cast iron brake disk 25 subjected to the maximal braking pressure increases rapidly, in the same way as that of the disk 26 which has a greater thickness but a lower conductivity than that of the disk 25. The sudden increase of the friction coefficient of the disk made of fibrous material 26 generally occurs during the rapid decrease phase of the friction coefficient of the disk made of cast iron and the variation of the deceleration rate of the motorcycle provoked by this sudden increase of the friction coefficient is attenuated due to the weaker braking pressure applied to this disk 26.

The braking circuit represented on FIG. 4 can, of course, be applied to the braking device having two disks shown in FIG. 3, the hydraulic chambers 76 and 75 being respectively connected to the brake conduits 78a and 80a. It will be noted that in this embodiment, due to the piston 74 acting on the disk made of fibrous material 68 has a smaller diameter than the piston 73 acting on the disk 67 made of stainless steel, the deceleration variation provoked by the passage of the transition temperature of the carbon fibers is further attenuated. During low pressure braking applications not acting on the brake piston 74, the disk 68 made of fibrous material undergoes heating through contact with the thin disk 67 and thus functions as a heat well with respect to this thin disk.

In the various embodiments of the invention, the brake user, i.e. the driver of the vehicle, has always noted that the combination of a ferrous metal brake disk with a brake disk made of fibrous material having a high heat resistance, tends to stabilize the effective mean friction coefficient obtained in function of the force for actuating the brakes (in principle, proportional to the muscular control force developed by the driver) with respect to a solution using two disks of fibrous material where the friction coefficient is low when cold and suddenly rises from 0.15 to 0.5 for a very slight supplementary heating of the friction surfaces, due to the passage by a transition temperature close to 400°-450° C. which completely alters the nature of the sliding friction.

Driving motorcycles requires that the brakes have a good stability of the friction coefficient in order to allow braking on cornering where a sudden increase of deceleration irremediably destabilizes the motorcycle. The application of the present invention has been described herein mainly with respect to high speed motorcycles, but it is obvious that it can apply to all rolling vehicles, especially to automobiles and to braking systems having multiple disks such as used on aircraft.

It is well understood that the present invention is in no way limited to the embodiments described and represented, but can be adapted to numerous variations available to those skilled in the art, without departing from the scope and spirit of the invention.

I claim:

1. A braking device for a wheel carried by a single wheel carrier and suspension arm of a motorcycle, comprising first and second centrally-splined brake disks associated with respective first and second brake linings, each disk having substantially the same inside and outside diameter and a braking surface and a rear surface, said disks being mounted on a rotating shaft carrying splines matching those of said disks with the respective rear surfaces back-to-back in contact over substantially the entire surface area of said rear surfaces, whereby said disks rotate integrally with said shaft while undergoing axial displacement along said shaft;
a central abutment integral with said shaft for limiting the axial displacement of said disks;
pairs of hydraulic cylinder-pistons mounted on respective arms of a brake caliper straddling said first and second brake disks, said pistons adapted to limit the axial displacement of the disks when in a fully retracted position in cooperation with said central abutment and adapted to engage said first and second brake linings, said first disk and said first lining being, respectively, composed of a heat resistant ferrous metallic material and a carbon-free friction material, said second disk and said second lining composed of a fibrous carbon-base material, said second disk being substantially thicker than said first disk, said brake caliper being rigidly fastened to said arm at a position such that said cylinder-piston pairs lie on each side of a median vertical plane of said wheel, wherein the reaction forces resulting from the application of a braking force to said disks are transferred to said arm at a point substantially coinciding with said median vertical axis; and master cylinder means hydraulically connected to said hydraulic cylinder-piston pairs and adapted, upon an initial application of said braking force thereto, to actuate only one of said pistons whereby, in cooperation with said central abutment, said contacting rear faces of said first and second disks adopt a position substantially coinciding with said median vertical axis of said wheel, and with the initial application of said braking force to said first disk at a position that also lies approximately on said median vertical plane thermal energy produced by said braking force from said first disk is transferred to said second disk with the corresponding cooling of said first disk, and said master cylinder means adapted to actuate said second piston to urge said second lining into contact with said heated second disk only when said initial braking force exceeds a predetermined offset value.

2. The braking device of claim 1, wherein said first disk has a thickness in the range of from 3 to 4mm and said second disk has a thickness of about 20mm and said first lining is composed of a hard sintered material.

3. The braking device of claim 1, wherein said first disk has a thickness in the range of from 3 to 4mm and said second disk has a thickness of about 20mm and said first lining is composed of an asbestos-based material.

* * * * *